Figure 1:
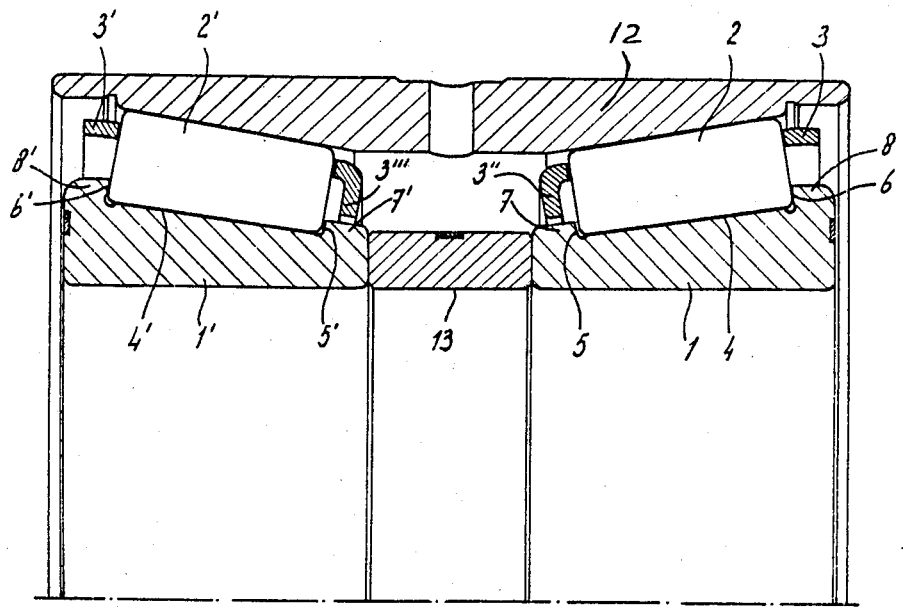

United States Patent [19]

Schalk

[11] Patent Number: 4,700,443
[45] Date of Patent: Oct. 20, 1987

[54] METHOD FOR THE ASSEMBLY OF AN INNER RACE FOR A ROLLER BEARING AND AN ANNULAR CAGE WHOSE OPENINGS CONTAIN ROLLING ELEMENTS

[75] Inventor: Bart Schalk, Zeist, Netherlands

[73] Assignee: SKF Industrial Trading and Development Company B.V., Nieuwegein, Netherlands

[21] Appl. No.: 750,916

[22] Filed: Jul. 1, 1985

[30] Foreign Application Priority Data

Jul. 2, 1984 [NL] Netherlands ............... 8402100

[51] Int. Cl.[4] .................. B21D 53/12; B21K 1/04; B21K 1/05
[52] U.S. Cl. ..................... 29/148.4 C; 29/148.4 R; 29/148.4 A; 29/453
[58] Field of Search ............ 29/148.4 C, 148.4 A, 29/148.4 R, 434, 453

[56] References Cited

U.S. PATENT DOCUMENTS

| | | | |
|---|---|---|---|
| T102,401 | 11/1982 | Toth ............... | 29/148.4 R |
| 1,920,102 | 7/1933 | Nolan ............... | 29/148.4 C |
| 1,982,896 | 12/1934 | Ackerman ............ | 29/148.4 C |
| 2,483,695 | 10/1949 | Edwards ............. | 29/148.4 C |
| 4,136,916 | 1/1979 | Musselman et al. .... | 29/148.4 C |
| 4,336,641 | 6/1982 | Bhatia .............. | 29/148.4 C |

Primary Examiner—Howard N. Goldberg
Assistant Examiner—Golabi, Irene Graves
Attorney, Agent, or Firm—Rosen, Dainow & Jacobs

[57] ABSTRACT

A method for assembly of an inner race for a roller bearing and an annular cage with rolling elements contained in openings in this cage, the inner race being placed essentially concentric with the cage with the rolling elements retained by the cage contained in a track fashioned in the outer circumferential surface of the race, the track being bordered on both sides by shoulders formed by opposing lateral surfaces of revolving flanges at, respectively, the inner and outer top surfaces of the inner race. The track is tapered from the outside toward the inside with regard to the cardioid line of the inner race and the rolling elements are formed of tapered cylinders. The cage and inner race are snapped together by pressing in the axial direction.

5 Claims, 4 Drawing Figures

METHOD FOR THE ASSEMBLY OF AN INNER RACE FOR A ROLLER BEARING AND AN ANNULAR CAGE WHOSE OPENINGS CONTAIN ROLLING ELEMENTS

Method for the assembly of an inner race for a roller bearing and an annular cage whose openings contain rolling elements.

The invention concerns a method for the assembly of an inner race for a roller bearing and an annular cage of metal or a similar material with rolling elements contained in openings in this cage, in such manner that the inner race is placed essentially concentrically within the cage with the rolling elements retained by the cage contained in a track fashioned in the outer circumferential plane of the race, whereby this track is bordered on both sides by shoulders formed by opposing lateral surfaces of radially revolving flanges at, respectively, the inner and outer top surfaces of the inner race, which track is tapered from the outside toward the inside with regard to the cardioid line of the inner race, and the rolling elements are formed by basically cylindrical elements whose circumferential surfaces are slightly tapered from the outside toward the inside.

A unit obtained in this manner consisting of an inner race with a number of rolling elements lying in its track and a cage surrounding this race and retaining and separating these rolling elements serves to create a roller bearing whereby two of these units are slid from both sides into an outer race, whereby the opposing inner surfaces of the inner race are kept in position by means of a ring.

The cage of a similar roller bearing serves to separate the rolling elements by means of ridges between the openings in the cage, which ridges are located between the rolling elements which project slightly outward in a radial direction from the openings. The dimensions of the openings in the cage must be such that the rolling elements are free to execute relatively small swinging motions, whereby the cardioid line of such a rolling element—from the position in which this cardioid line runs parallel to the cardioid line of the roller bearing—swings over relatively small angles to both sides, into positions in which this cardioid line crosses the latter cardioid line, which effect is called the inclination.

According to the known method for assembling an inner race for a roller bearing and a cage containing rolling elements, the cage is slightly expanded by means of special assembly tools, and then slid over the inner race.

Roller bearings with units consisting of a cage, inner race and rolling elements assembled according to the known method, are subject to quite high friction levels with, as a result, a short working life.

It has been established that these high friction levels are due to a disturbance in the lubrication system of the bearing on account of permanent deformations of the cage caused by the expansion of the cage when assembling the inner race; due to these permanent deformations the aforementioned inclination of the rolling elements is impaired to a great extent, which causes a breakdown in lubrication of the bearing.

According to the invention, a method is offered for assembling an inner race for a roller bearing and an annular cage containing rolling elements, whereby the cage does not suffer permanent deformations, so that the inclination of the rolling elements is not impaired in any way and that the roller bearings ultimately produced by means of the units thus obtained have a much longer working life; which method is characterized by the fact that from the end of the inner flange of the inner race, material is removed in such manner that a revolving end plane is obtained of this flange which—with regard to the cardioid line of the race—is tapered from the inside toward the outside of the flange, following which the inner race and the cage containing the rolling elements are brought together in an axial direction, essentially concentrically and, through the exertion of force, are pressed together, whereby the rolling elements slide over the slanting end plane of the inner flange until they seat in the track of the inner race.

It is advantageous, in this respect, to round off at the least the outer edge of the inner flange.

It is preferable to support the cage containing the rolling elements at the inner edge with a bearing plane equipped with an annular groove, and to press the inner race from the outer edge of the cage into the cage, until the inner end of the race is contained in the groove.

Because the method according to the invention does not result in permanent, basically unpredictable deformations of the cage, it is possible to shape the cage in an advantageous manner so that the sides of the ridges bordering the openings in the cage have a slightly convex shape in the direction of the openings.

In a cage executed in this manner the opposing convex sides of the ridges constitute basically two pivots for the rolling element contained in an opening, as a result of which the aforementioned inclination of the rolling elements is improved and, consequently, also the lubrication of the bearing.

Figure 2:
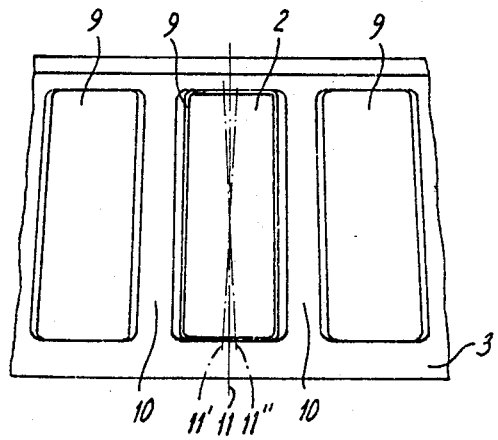
Figure 3:
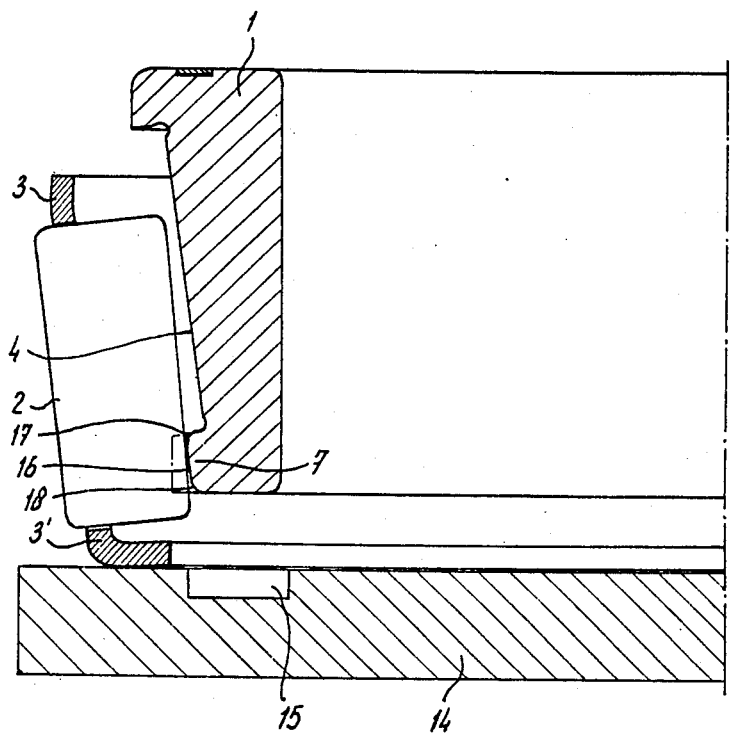
Figure 4:
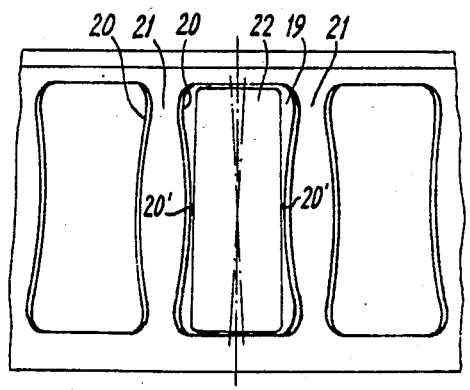

The invention is further described with reference to the drawing in which:

FIG. 1 shows in axial section a roller bearing composed of two units obtained according to the method according to the invention and consisting of an inner race, a cage and rolling elements, FIG. 2 shows on interior view of part of the cage, FIG. 3 shows in axial section how, according to the method according to the invention, the unit consisting of an inner race, a cage and rolling elements is obtained and FIG. 4 shows a schematic and exaggerated view of part of a cage in a form of execution according to the invention.

The roller bearing shown in FIG. 1 includes two units consisting of an inner race 1, 1', rolling elements 2, 2', and cages 3, 3', which units are identical so that only one unit will be described in detail. Corresponding parts of the other unit are indicated by the same reference numbers, with the addition of a prime symbol.

In the outer circumferential surface of the inner race 1 a track 4 is fashioned which, with regard to the cardioid line, is tapered from the outside toward the inside; which track is bordered on both sides by the shoulders 5 and 6 formed by the opposing annular lateral surfaces of the radially revolving flanges 7 and 8.

The rolling elements 2 are formed by basically cylindrical elements with circumferential surfaces which are slightly tapered from the outside toward the inside.

The cage 3 is formed by an annular plate of metal or a similar material which is bent back at one end 3' to form a flange projecting inward, and which is equipped with a number of openings 9 (see FIG. 2) separated from one another by ridges 10. The rolling elements 2 are retained by the cage 3, whereby these rolling elements project slightly outward in a radial direction from the openings 9. The dimensions of the openings 9 are such that the rolling elements 2 are free to execute relatively small swinging motions so that the cardioid line 11 of a similar rolling element can swing between the positions 11' and 11" indicated in FIG. 2, which is called the inclination.

Both of the aforementioned units are slid from both sides into the outer race 12, whereby the opposing inner sides of the inner races 1 and 1' are kept at a distance from one another by means of an intermediate ring 13.

As shown in FIG. 3, for the assembly of each unit mentioned, the cage 3 containing the rolling elements 2 is placed with the flange 3' on a bearing surface 14 equipped with an annular groove 15. Subsequently, the inner race 1 is pressed in an axial direction, concentrically, in the unit consisting of cage 3 and rolling elements 2, until the rolling elements 2 seat in the track 4, whereby the bottom end with the flange 7 of the race 1 seats in the groove 15.

Beforehand, the material indicated with the broken lines at the end of the inner flange 7 has been removed, so that a revolving end surface 16 has been obtained at the inner flange 7 which, with regard to the cardioid line of the inner race, is tapered from the inside toward the outside of the flange. In addition, the inner edge 17 and the outer edge 18 of the flange 7 are rounded off.

When the inner race 1 and the cage 3 with the rolling elements 2 are assembled in this manner according to the invention, the cage 3 is not permanently deformed, so that the inclination of the rolling elements 2 is not impaired.

As shown in FIG. 4, for the method according to the invention the cage may have such a shape that the sides 20 of the ridges 20 bordering the openings 19 are slightly convex, e.g., 50μ over 40 mm. This means that at 20' there are basically pivots for the rolling elements 22, which improve the inclination of the rolling elements.

What is claimed is:

1. Method for the assembly of an inner race for a roller bearing and an annular cage with rolling elements contained in openings in this cage separated by ridges, said inner race being placed essentially concentrically within the cage with the rolling elements retained by the cage contained in a track fashioned in the outer circumferential surface of the inner race, said track being bordered on both sides by shoulders formed by opposite lateral surfaces of radially revolving flanges at, respectively, the inner and outer top surfaces of the inner race, which track is tapered from the outside toward the inside with regard to the cardioid line of the inner race, and the rolling elements are formed by basically cylindrical elements whose circumferential surfaces are slightly tapered from the outside toward the inside, a revolving end plane of the inner flange with regard to the cardioid line of the ring, is tapered from the inside toward the outside of the flange, comprising the steps;
   (a) inserting said rolling elements into said cage openings;
   (b) supporting said cage containing said rolling elements with the narrow diameter end of said cage on a bearing plane which is formed with an annular groove of diameter and width corresponding to the inside narrower end of said inner race,
   (c) aligning said inner race with said cage,
   (d) pressing said inner race into said cage, said race entering from the outer, larger diameter end of said cage,
   (e) continue pressing until the inner end of said race is contained in said annular groove in said bearing surface and said rolling elements seat on said track,
   and comprising the further step preceding step (a) of forming the sides of said ridges bordering the openings in the cage to have a slightly convex shape in the direciton of the openings, said openings being narrowed, as viewed in a plan view, by said convex shape.

2. Method according to claim 1, wherein at least the outer edge (18) is rounded off.

3. A unit for a roller bearing including an inner race and an annular cage with rolling elements contained in openings in said cage, said rolling elements being separated by ridges between said openings, said inner race being positioned substantially concentrically within said cage with said rolling elements retained by said cage, said inner race having inner and outer radially extending flanges at the inner and outer ends of said inner race, a track being formed in the outer circumferential surface of said inner race, said track being bordered on both sides by said flanges, said track being tapered from the outside toward the inside with regard to the cardioid line of the inner race, and said rolling elements being formed by basically cylindrical elements having circumferential surfaces slightly tapered from the outside toward the inside, the improvement therein comprising a taper of the circumferentail surface of said inner flange from the inside nearer said track toward the outside of the inner flange with regard to the cardioid line of said race, the outermost edge of said inner flange being rounded, and the sides of said ridges bordering said openings in the cage have a slightly convex shape in the direction of the openings as viewed in a plan view, said rolling elements being subject to pivoting on said sides.

4. A unit is claimed in claim 3, and further comprising an outer race and an additional unit, said units being positioned relative to each other with opposed inner flange surfaces, said outer race surrounding both said units.

5. A unit as claimed in claim 3, wherein the inner most edge of said inner flange is rounded.

* * * * *